(No Model.)
D. AIGLER.
DEVICE FOR MASHING POTATOES OR OTHER VEGETABLES.
No. 467,488. Patented Jan. 26, 1892.
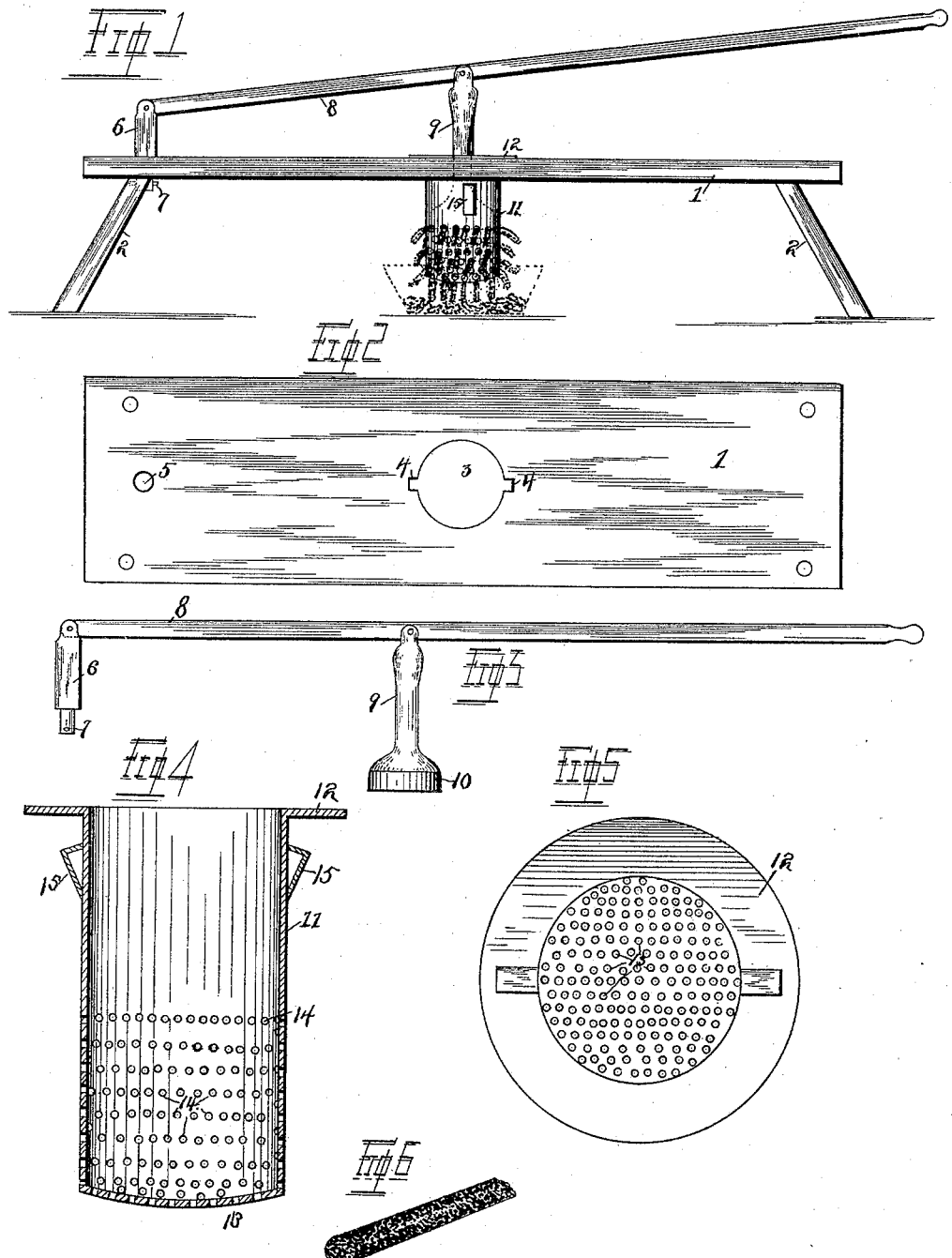
Witnesses
A. A. Eicke
[signature]
David Aigler Inventor
By his Attorneys Higdon & Higdon

UNITED STATES PATENT OFFICE.

DAVID AIGLER, OF ST. LOUIS, MISSOURI.

DEVICE FOR MASHING POTATOES OR OTHER VEGETABLES.

SPECIFICATION forming part of Letters Patent No. 467,488, dated January 26, 1892.

Application filed September 12, 1891. Serial No. 405,479. (No model.)

*To all whom it may concern:*

Be it known that I, DAVID AIGLER, of the city of St. Louis and State of Missouri, have invented certain new and useful Improvements in Methods of and Means for Preserving Vegetable Foods, especially Potatoes, of which the following is a full, clear and exact description, reference being had to the accompanying drawings, forming a part hereof.

My invention relates to improvements in a device for mashing potatoes and other vegetables; and it consists in the novel arrangement and combination of parts, as will be more fully hereinafter described, and designated in the claim.

In the drawings, Figure 1 is a side elevation of my complete invention, showing the same when in use. Fig. 2 is a top plan view of the stand with parts removed. Fig. 3 is a side elevation of the compressing mechanism detached from the stand. Fig. 4 is a longitudinal section of the receptacle in which the potatoes or other vegetables are placed. Fig. 5 is a bottom plan view of the same. Fig. 6 is a perspective view of the substance after it has been compressed and passed through the receptacle.

I will give a description of the use and object of my invention, in connection with a mechanical description thereof.

Referring to the drawings, 1 indicates the stand on which part of my invention is supported. Said stand 1 is provided with a series of legs 2 of the ordinary construction, as illustrated in Fig. 1, and also with a central cylindrical hole 3, and projecting from the inner peripheral surface of said hole 3 are two diametrically-opposite angular recesses 4 of the construction, as illustrated in Fig. 2.

5 indicates a perforation in which a standard 6 is adapted to loosely fit and rotate, and said standard 6 is secured to stand 1 and in perforation 5 by a removable pin 7. Said standard 6 is provided with an upper bifurcated end, in which an operating-lever 8 is pivotally secured.

9 indicates a plunger for compressing the substance, the same being provided with a bifurcated upper end, in which the operating-lever 8 is pivotally secured, and with a lower enlarged cylindrical end 10.

11 indicates a receptacle in which the vegetable product to be compressed is placed. Said receptacle 11 is provided on its upper open end with an extended peripheral flange 12 and on its closed end with a series of cylindrical holes or perforations 13, and also in the sides of its lower terminal portion with a series of similar perforations 14. The perforations 13 and 14 answer as exit-openings for the compressed vegetable product.

15 indicates skeleton projections secured to a receptacle 11, which prevent said receptacle from being pulled or elevated out of the stand 1 only when desired by the operator. Said skeleton projections 15 are adapted to pass through the angular recesses 4 in the operation of placing and removing the receptacle 11 out of the stand 1, and to facilitate the insertion of the projections they are inclined inwardly on their lower sides. In other words, when the operator desires to place the receptacle in the stand 1 ready for use he inserts the receptacle 11 in hole 3, causing the skeleton projections 15 to enter and pass through the recesses 4 and allowing said receptacle to rest in stand 1 and supported on said stand by the peripheral flange 12. After placing the receptacle in such a position I may turn or rotate said receptacle in hole 3, thus bringing the skeleton projections 15 out of alignment with the recesses 4, and in such a position the said receptacle cannot be removed—or, in other words, to remove the receptacle 11 embodies a similar operation as inserting the same in the hole 3.

The enlarged cylindrical end of the plunger 9 is adapted to snugly fit in the receptacle 11, and the object of said plunger 9 is to compress and mash the vegetable product that is placed in said receptacle.

Although I can use my invention for mashing and compressing various vegetable products, I will only describe its application and use in connection with a preparation of potatoes. It may be noted in this connection that my invention is especially designed for preparing potatoes ready for eating in the future.

The preparation is as follows: The potatoes are first peeled and then cooked in any desired manner, preferably by being boiled.

They are then placed in receptacle 11 and compressed and mashed by means of the plunger 9. The mashed and compressed product passes through the cylindrical perforations 13 and 14 in the form of cylindrical sticks, as illustrated in Fig. 6, and the said cylindrical sticks may then be dried in the air, or in any other suitable manner, and then be stored away for future use.

Having fully described my invention, what I claim is—

The herein-described device for mashing and compressing vegetable products in sticks, having a stand 1, provided with legs 2, a cylindrical hole formed in said stand, two diametrically opposite angular recesses 4, projecting from the inner peripheral surface of said hole 3, a bifurcated rotating standard 6, mounted in said stand, an operating-lever 8, carrying a plunger 9, pivotally secured to said standard, a receptacle 11, provided at its upper open end with a peripheral extended flange 12 and in its lower closed end and lower terminal portion with a series of cylindrical perforations or holes 13 and 14, and skeleton projections 15, secured to the sides of said receptacle and diametrically opposite to each other for holding said receptacle in the stand 1 only when it is desired to remove the same, said projections being inclined inwardly on their lower sides, so as to facilitate their insertion into the recesses 4, substantially as set forth.

In testimony whereof I affix my signature in presence of two witnesses.

DAVID AIGLER.

Witnesses:
 ED. E. LONGAN,
 BENJ. J. KLENE.